United States Patent
Onoda

(10) Patent No.: US 10,446,999 B2
(45) Date of Patent: Oct. 15, 2019

(54) MOLDING METHOD USING MOLD STRUCTURE

(71) Applicant: YAZAKI CORPORATION, Tokyo (JP)

(72) Inventor: Shinya Onoda, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 531 days.

(21) Appl. No.: 14/790,095

(22) Filed: Jul. 2, 2015

(65) Prior Publication Data

US 2015/0372438 A1 Dec. 24, 2015

Related U.S. Application Data

(60) Division of application No. 13/712,305, filed on Dec. 12, 2012, now Pat. No. 9,118,129, which is a (Continued)

(30) Foreign Application Priority Data

Jun. 14, 2010 (JP) ................................ 2010-135161

(51) Int. Cl.
*H01R 43/24* (2006.01)
*H01R 25/14* (2006.01)
(Continued)

(52) U.S. Cl.
CPC ............. *H01R 43/24* (2013.01); *B29C 45/04* (2013.01); *B29C 45/14008* (2013.01);
(Continued)

(58) Field of Classification Search
None
See application file for complete search history.

(56) References Cited

U.S. PATENT DOCUMENTS 6,325,640 B1 12/2001 Kasai
6,431,921 B2 8/2002 Saito et al.
(Continued)

FOREIGN PATENT DOCUMENTS

CN 1489251 A 4/2004
EP 1548882 A1 6/2005
(Continued)

OTHER PUBLICATIONS

Communication dated Apr. 7, 2015 from the State Intellectual Property Office of People's Republic of China in counterpart Application No. 201180029344.X.
(Continued)

*Primary Examiner* — Matthew J Daniels
*Assistant Examiner* — Mohammad M Ameen
(74) *Attorney, Agent, or Firm* — Sughrue Mion, PLLC

(57) ABSTRACT

A molding method includes: setting a bus bar at a first mold main body portion of a fixed mold by supporting a terminal base of a tuning-fork terminal with a terminal base receiving portion of the fixed mold in a state where the tuning-fork terminal is protruded outside a cavity formed by the first mold main body portion of the fixed mold and a second mold main body portion of a movable mold being joined together; joining the movable mold together with the fixed mold by abutting an abut step portion of the movable mold to a receiving abut step portion of the fixed mold and nipping the terminal base of the tuning-fork terminal with the terminal base receiving portion and a terminal base abut portion of the movable mold; and injecting resin into the cavity in the nipped state.

4 Claims, 11 Drawing Sheets

Related U.S. Application Data continuation-in-part of application No. PCT/JP2011/063348, filed on Jun. 10, 2011.

(51) Int. Cl.

| | | |
|---|---|---|
| *H01H 69/02* | (2006.01) | |
| *H01H 85/045* | (2006.01) | |
| *H01H 85/10* | (2006.01) | |
| *H01R 13/11* | (2006.01) | |
| *B29C 45/04* | (2006.01) | |
| *B29C 45/14* | (2006.01) | |
| *H01H 85/04* | (2006.01) | |
| *H01R 43/16* | (2006.01) | |
| *H01H 85/02* | (2006.01) | |
| *B29L 31/36* | (2006.01) | |
| *B29L 31/34* | (2006.01) | |

(52) U.S. Cl.
CPC .. *B29C 45/14065* (2013.01); *B29C 45/14467* (2013.01); *H01H 69/02* (2013.01); *H01H 85/04* (2013.01); *H01H 85/0456* (2013.01); *H01H 85/10* (2013.01); *H01R 13/112* (2013.01); *H01R 25/14* (2013.01); *H01R 43/16* (2013.01); *B29C 45/045* (2013.01); *B29C 45/14* (2013.01); *B29C 2045/1486* (2013.01); *B29L 2031/3493* (2013.01); *B29L 2031/36* (2013.01); *H01H 2085/025* (2013.01)

(56) References Cited

U.S. PATENT DOCUMENTS

| | | | |
|---|---|---|---|
| 6,512,443 B1 | 1/2003 | Matsumura et al. | |
| 7,338,296 B2 | 3/2008 | Suzuki | |
| 2002/0064999 A1* | 5/2002 | Kobayashi | H01H 85/0417 439/620.34 |
| 2002/0076983 A1 | 6/2002 | Nakanishi | |
| 2003/0090358 A1* | 5/2003 | Morimoto | H01L 24/49 337/269 |
| 2004/0185722 A1 | 9/2004 | Conrad | |
| 2005/0153583 A1 | 7/2005 | Kawamura et al. | |
| 2009/0111316 A1 | 4/2009 | Matsumoto et al. | |
| 2011/0306243 A1 | 12/2011 | Shiraki | |
| 2012/0202367 A1 | 8/2012 | Uchida et al. | |
| 2013/0280952 A1 | 10/2013 | Saimoto et al. | |

FOREIGN PATENT DOCUMENTS

| | | | |
|---|---|---|---|
| JP | 11-307218 | * | 11/1999 |
| JP | 11-307218 A | | 11/1999 |
| JP | 2000-331591 A | | 11/2000 |
| JP | 2002-58137 A | | 2/2002 |
| JP | 200242633 A | | 2/2002 |
| JP | 2003-218554 A | | 7/2003 |
| JP | 2005-185032 A | | 7/2005 |
| JP | 2007-43827 A | | 2/2007 |
| JP | 2009-110807 A1 | | 5/2009 |

OTHER PUBLICATIONS

Communication dated Aug. 4, 2014, issued by the State Intellectual Property Office of P.R. China in counterpart Chinese application No. 201180029344.X.
Communication dated May 26, 2015, issued by the Japanese Patent Office in counterpart Application No. 2014146005.
Japanese Office Action dated Apr. 1, 2014 in the counterpart Japanese application No. 2010-135161.
Korean Office Action dated May 22, 2014 issued in Korean Patent Application No. 10-2012-7034107.
Korean Office Action dated Nov. 12, 2013 issued in Korean Patent Application No. 10-2012-7034107.
Communication dated Sep. 26, 2017, from the Intellectual Property India Patent Office in counterpart India application No. 180/CHENP/2013.

* cited by examiner

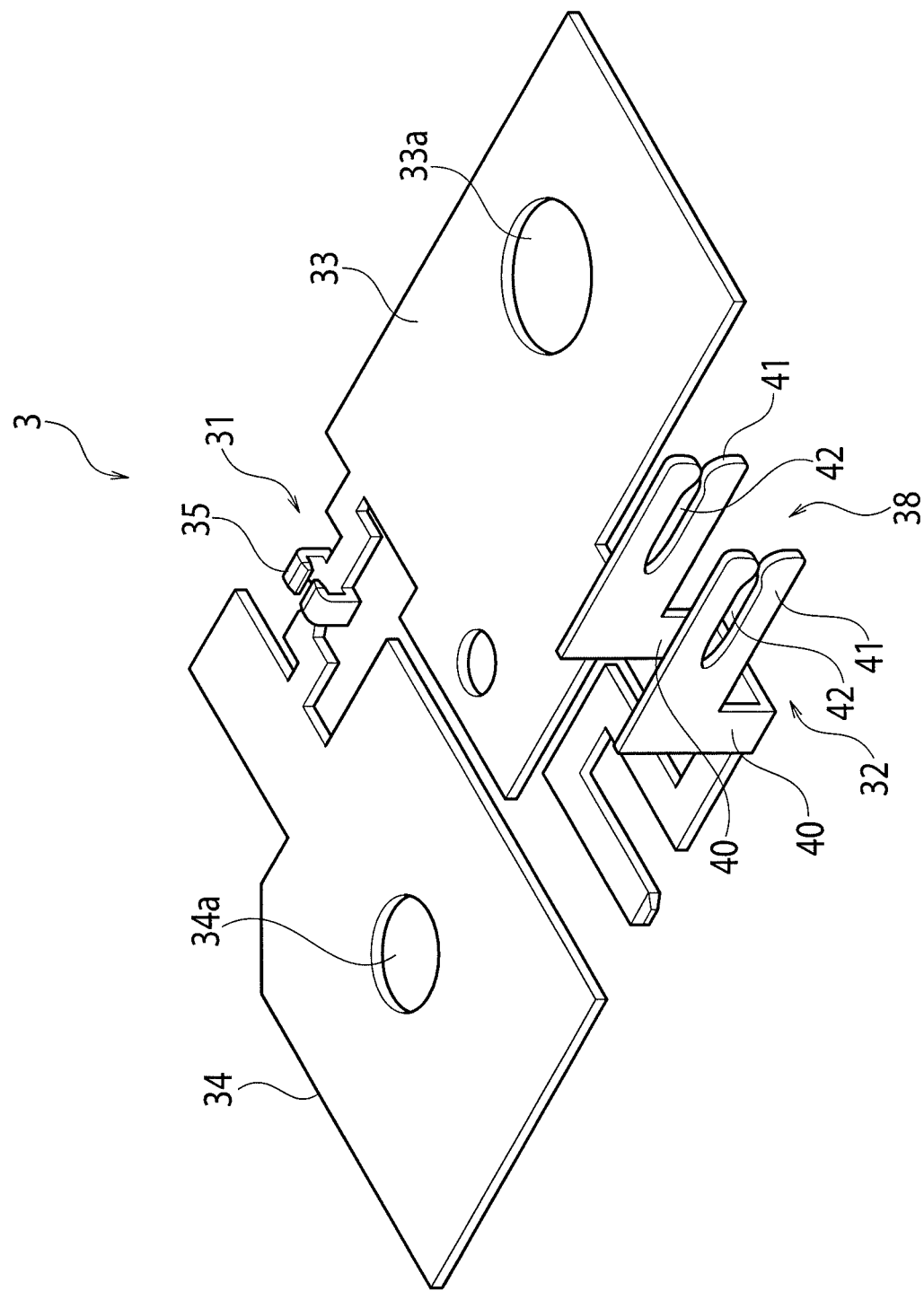

MOLDING METHOD USING MOLD STRUCTURE

CROSS REFERENCE TO RELATED APPLICATION

This is a Divisional of U.S. application Ser. No. 13/712,305, filed on Dec. 12, 2012, which is a continuation-in-part Application of PCT Application No. PCT/JP2011/063348, filed on Jun. 10, 2011, and claims the priority of Japanese Patent Application No. 2010-135161, filed on Jun. 14, 2010. The entire disclosures of the prior applications are considered part of the disclosure of the accompanying divisional application, and are hereby incorporated by reference.

BACKGROUND

1. Technical Field

The disclosure relates to a mold structure used for manufacturing electrical components such as a fusible link unit for by insert molding of a bus bar, a molding method using the mold structure, and a fuse unit.

2. Related Art

As described in Patent Literature 1, for example, a fusible link unit connects a vehicle mounted battery and an electrical wire to supply power source to a vehicle mounted load and is mounted on a position to receive influence of vehicle body vibration. At a position to receive influence of vehicle body vibration, in consideration of breakage of a unit main body and a bus bar owing to resonance, manufacturing is performed as injecting resin in a state where the bus bar having a main body circuit unit formed is inserted into a molding mold. Since the bus bar and a resin molded product becomes integrated by insert molding of the bus bar as described above, resonance due to vibration can be suppressed.

On the other hand, there are cases that a tuning-fork terminal formed in a tuning-fork-like shape is arranged at the bus bar. The tuning-fork terminal acts to perform electrical connection with an external terminal as the external terminal such as a fuse is inserted in a contacted state. The tuning-fork terminal is required to be exposed to the outward of the resin molded product.

FIGS. 1 and 2 illustrate a related mold structure to mold a tuning-fork terminal 200 part arranged at a bus bar. In the drawings, mold joining (mold crimping) of a fixed mold 110 and a movable mold 120 is performed in a state where the bus bar is set between the molds 110, 120 and a cavity is formed. Then, resin is injected into the cavity.

An accommodation space 140 to accommodate the tuning-fork terminal 200 is formed at a mold joining face (parting face) 130 side of the movable mold 120 to expose the tuning-fork terminal 200 to the outside of the resin molded product. The bus bar is set to the fixed mold 110 to be at a position corresponding to the accommodation space 140 of the tuning-fork terminal 200 and mold joining is performed after the setting. Since the tuning-fork terminal 200 is accommodated in the accommodation space 140 owing to the mold joining, the tuning-fork terminal 200 is independent from the cavity and is not buried with resin injected into the cavity. Accordingly, the tuning-fork terminal 200 can be in a state to be exposed from the resin molded product.

CITATION LIST

Patent Literature

Patent Literature 1: Japanese Unexamined Patent Application Publication No. 2000-331591

SUMMARY

However, there are cases that a tuning-fork terminal 200 contacts to an inner face of a mold (movable mold 120) at the time of mold joining for the related mold structure. Further, there are cases that pressing force illustrated by arrow R in FIG. 2 acts on the tuning-fork terminal 200 with the mold joining. The tuning-fork terminal 200 may be deformed owing to the above so as to cause defective goods.

An object of the present invention is to provide a mold structure without causing deformation of a tuning-fork terminal at the time of insert molding of a bus bar and a molding method using the mold structure.

Further, another object of the present invention is to provide a fuse unit which can be molded without using a slide mold and which is unnecessary to prepare a fuse holder.

A first aspect of the present invention is a fuse unit including a press-molded bus bar attached to a battery terminal, and a tuning-fork terminal including a pair of mutually-faced nipping pieces configured to nip and hold a fuse to be electrically connected to the fuse, wherein one of the pair of nipping pieces is electrically connected to the bus bar, the other of the pair of nipping pieces is electrically connected to the outside, and the bus bar and the tuning-fork terminal are integrally molded with the pair of nipping pieces being exposed.

According to the first aspect, since molding can be performed without using a slide mold and a fuse terminal is nipped with a tuning-fork terminal, a fuse holder to hold a fuse is not necessarily arranged separately.

The bus bar may include a fusible body to be attached to the battery terminal, and the fusible body may be molded integrally with the bus bar and the tuning-fork terminal.

A second aspect of the present invention is a mold structure to bury a bus bar having a main body circuit unit with a tuning-fork-like tuning-fork terminal along with molding of a resin molded product with a fixed mold and a movable mold, wherein the fixed mold includes a first mold main body portion configured with the movable mold to form a cavity for the main body circuit unit to be arranged therein and resin to be injected therein, the cavity being for the main body circuit unit to be buried in the resin to form the resin molded product, a terminal base receiving portion configured to support a terminal base of the tuning-fork terminal, and a receiving abut step portion for the movable mold to be abutted thereto, the movable mold includes a second mold main body portion configured with the fixed mold to form the cavity by joining together with the first mold main body portion of the fixed mold, a terminal base abut portion configured to nip a terminal base of the tuning-fork terminal together with the terminal base receiving portion, and an abut step portion configured to abut to the receiving abut step portion of the fixed mold, and the fixed mold and the movable mold as joined together are configured to nip the terminal base between the terminal base receiving portion and the terminal base abut portion with the tuning-fork terminal being protruded outside the cavity.

According to the second aspect, at the time of mold joining of the fixed mold and the movable mold, the terminal base of the tuning-fork terminal is nipped with the terminal base receiving portion formed at the fixed mold and the terminal base abut portion formed at the movable mold while the abut step portion of the movable mold abuts to the receiving abut step portion of the fixed mold. Thus, positioning and fixing of the tuning-fork terminal against the fixed mold and the movable mold is performed. Since the tuning-fork terminal is arranged to be protruded to the outside of the cavity formed by joining the mold main body portions of the fixed mold and the movable mold with such nipping state of the tuning-fork terminal, the tuning-fork terminal can be exposed from the resin molded product even when resin is injected into the cavity.

Further, according to the second aspect, since the tuning-fork terminal is protruded to the outside of the cavity in the mold joining state, the tuning-fork terminal is in a free state against the fixed mold and the movable mold not only for the absence of contact between the molds but that pressing force of the molds does not occur. Therefore, deformation of the tuning-fork terminal does not occur and occurrence of defective goods can be prevented.

The mold structure may bury the bus bar provided with the tuning-fork terminal formed with a bus bar end and a press fitting contact portion, the press fitting contact portion having a pair of nipping pieces and being integrally extended from the bus bar end, the pair of nipping pieces each having an insertion opening formed at a top end side thereof for a counterpart terminal and a slit formed continuously from the insertion opening, and the fixed mold and the movable mold as joined together may be configured to hold the pair of nipping pieces with the pair of nipping pieces being protruded outside the cavity.

According to the above structure, in addition to the effects of the second aspect, since the nipping pieces of the tuning-fork terminal is protruded to the outside of the cavity, the whole of the tuning-fork terminal is not exposed from the resin molded product and a part (bus bar end) is buried in the resin molded product. Thus, supporting force of the resin molded product against the tuning-fork terminal is enlarged and strength can be applied to the tuning-fork terminal.

A third aspect of the present invention is a molding method using a mold structure to bury a bus bar having a main body circuit unit with a tuning-fork-like tuning-fork terminal along with molding of a resin molded product with a fixed mold and a movable mold, the molding method including setting the bus bar at a first mold main body portion of the fixed mold by supporting a terminal base of the tuning-fork terminal with a terminal base receiving portion of the fixed mold in a state where the tuning-fork terminal is protruded outside a cavity formed by the first mold main body portion of the fixed mold and a second mold main body portion of the movable mold being joined together, joining the movable mold together with the fixed mold by abutting an abut step portion of the movable mold to a receiving abut step portion of the fixed mold and nipping the terminal base of the tuning-fork terminal with the terminal base receiving portion and a terminal base abut portion of the movable mold, and injecting resin into the cavity in the nipped state.

According to the third aspect, the tuning-fork terminal is set to be arranged as protruding to the outside of the cavity formed by joining the mold main body portions of the fixed mold and the movable mold when the terminal base is to be supported by the terminal base receiving portion of the fixed mold. At the time of mold joining performed subsequently, the terminal base of the tuning-fork terminal is nipped with the terminal base receiving portion of the fixed mold and the terminal base abut portion of the movable mold. Owing to the above, the tuning-fork terminal is to be in a free state locating at the outside of the cavity. Therefore, not only does the contact between the molds do not occur but pressing force of the mold does not act. Accordingly, the tuning-fork terminal does not deform and occurrence of defective goods owing to deformation can be prevented.

BRIEF DESCRIPTION OF DRAWINGS

FIG. 3 is a perspective view of a bus bar applied to a mold structure according to an embodiment of the present invention.

DETAILED DESCRIPTION

Figure 1:
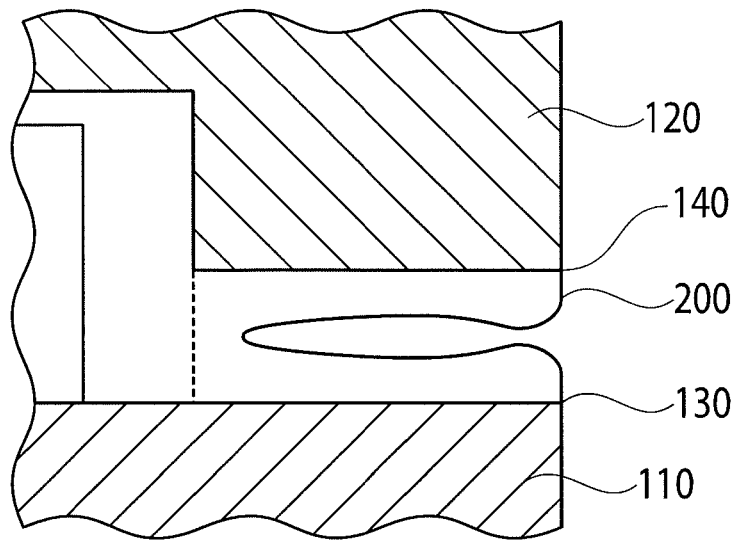
FIG. 1 is a sectional side view illustrating molding with a related mold structure.
Figure 2:
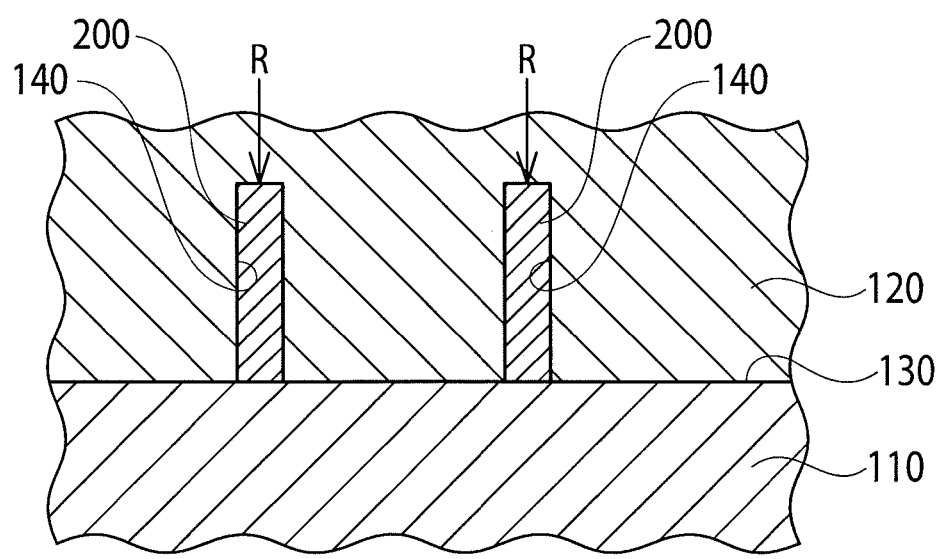
FIG. 2 is a sectional plane view illustrating molding with the related mold structure.
Figure 4B:
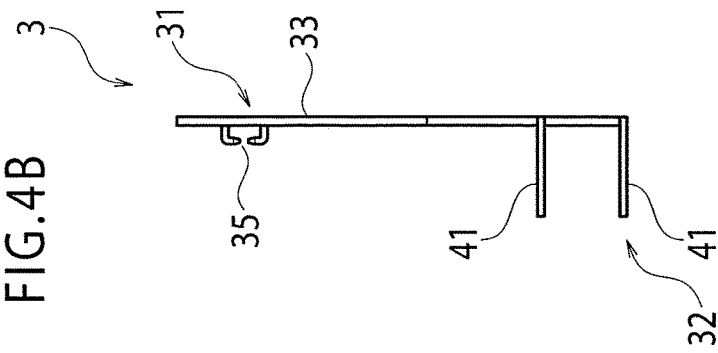
FIG. 4B is a right side view of the bus bar illustrated in FIG. 3.
Figure 4A:
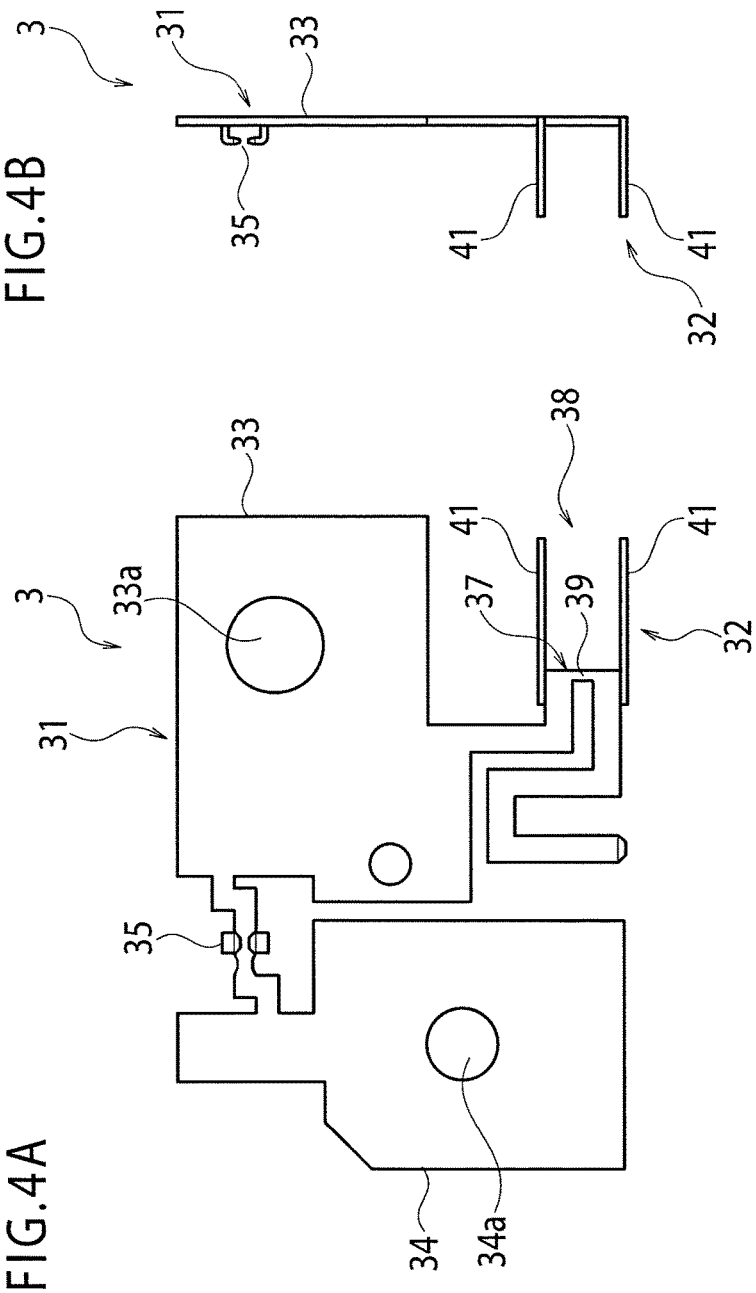
FIG. 4A is a plane view of the bus bar illustrated in FIG. 3.
Figure 4C:
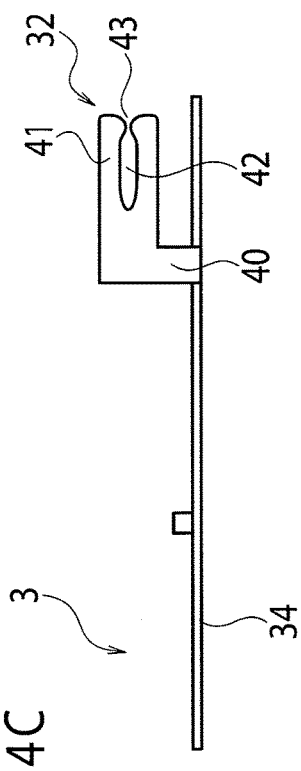
FIG. 4C is a front view of the bus bar illustrated in FIG. 3.
Figure 5:
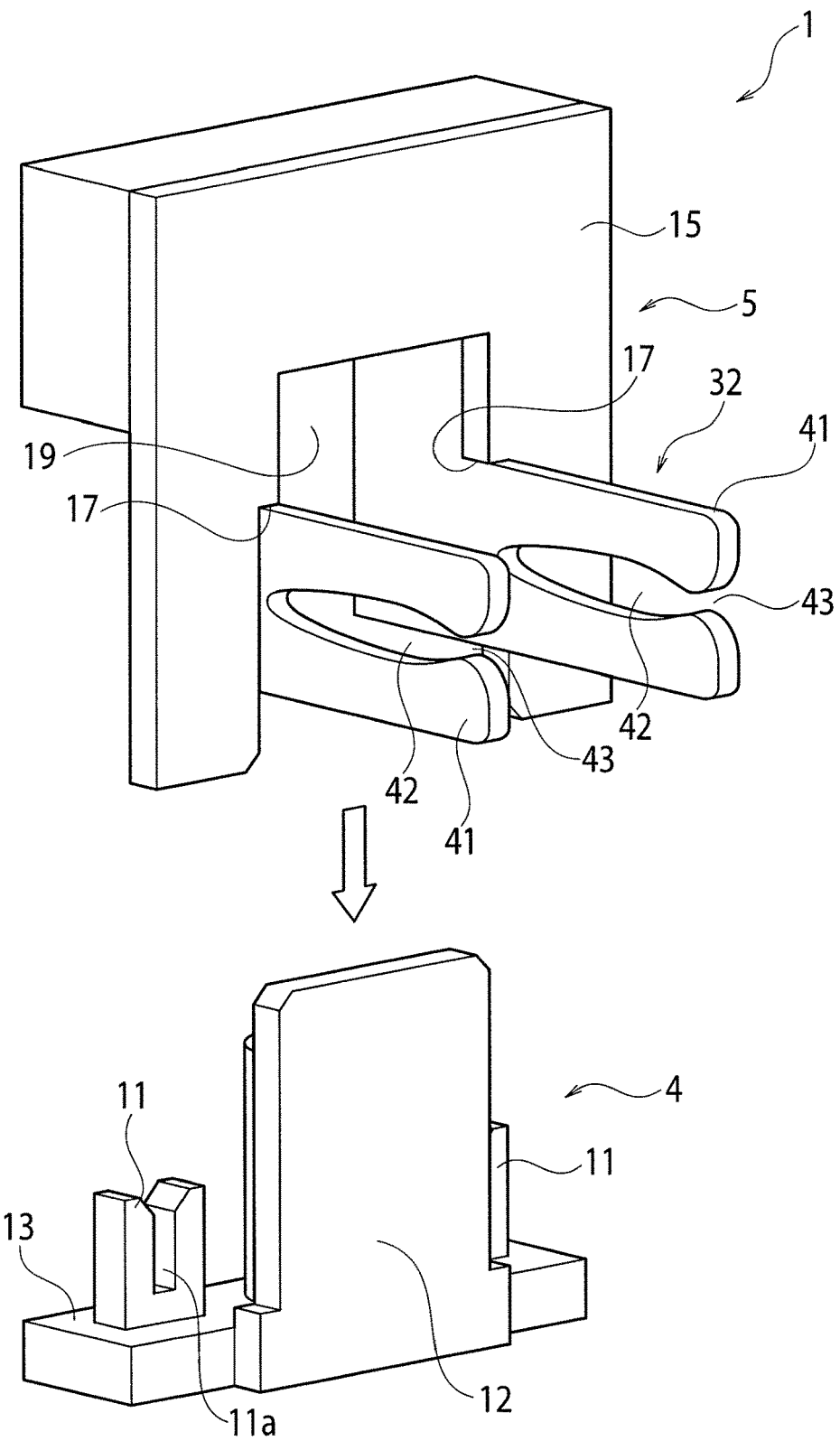
FIG. 5 is a perspective view illustrating a substantial part of the mold structure according to the embodiment of the present invention.
Figure 6:
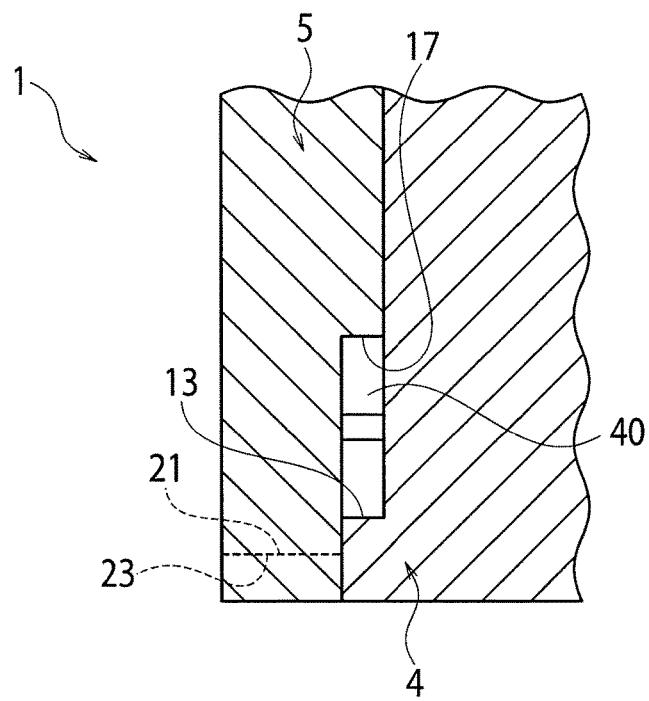
FIG. 6 is a sectional view illustrating the substantial part of the mold structure.
Figure 7:
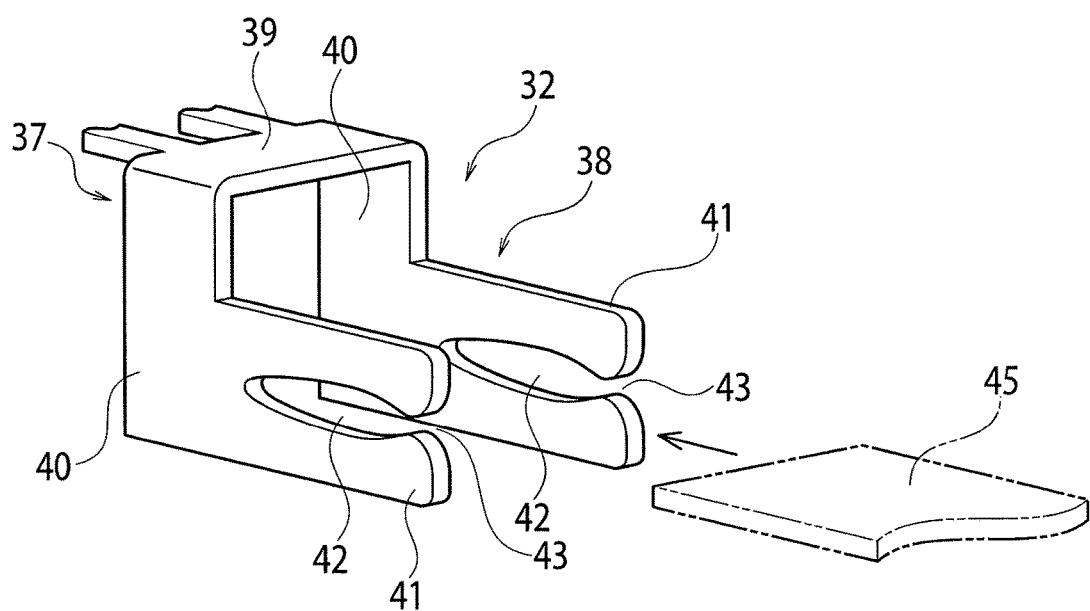
FIG. 7 is a perspective view illustrating a tuning-fork terminal of the bus bar.
Figure 8:
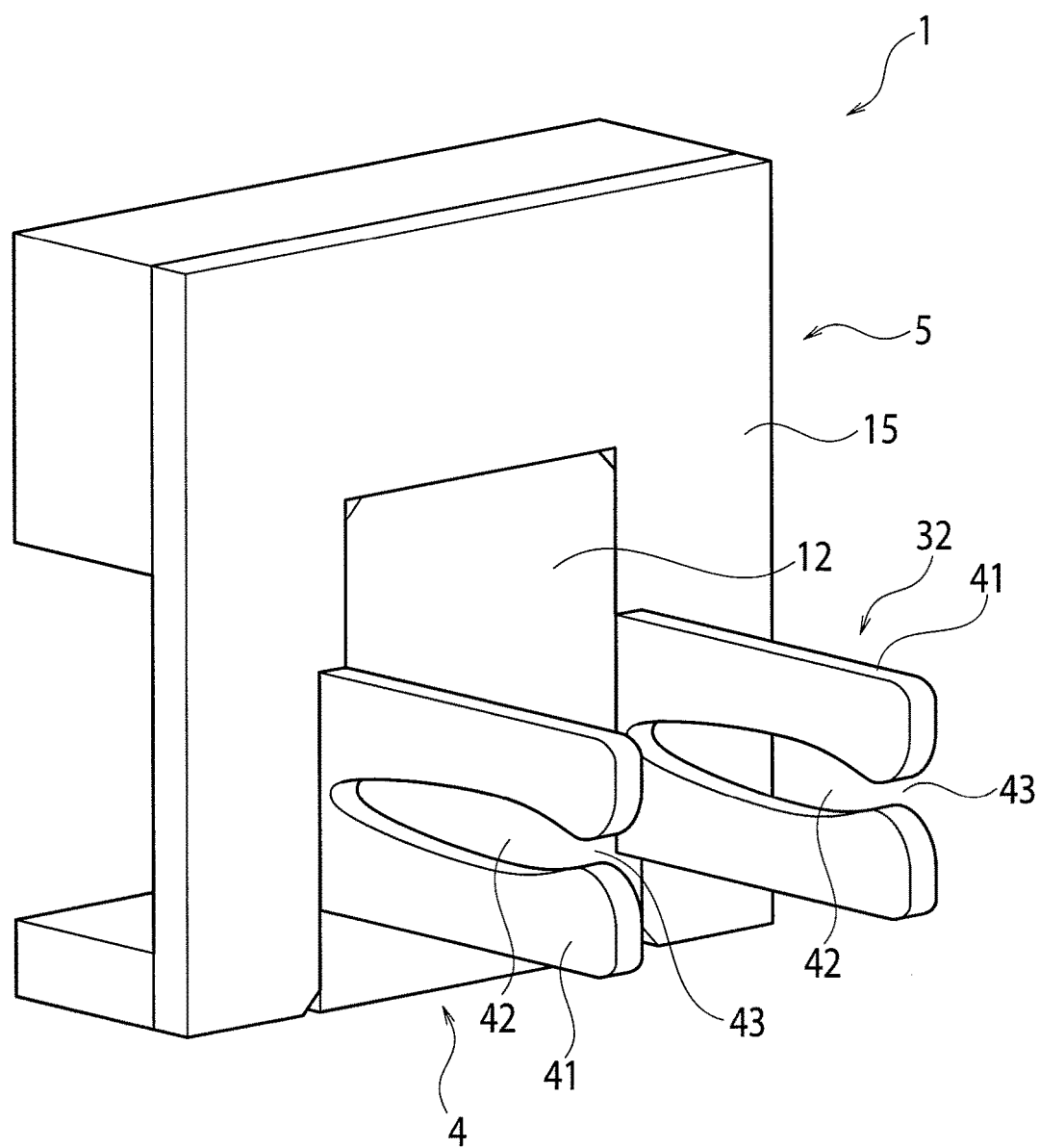
FIG. 8 is a perspective view illustrating a supporting state of the tuning-fork terminal at the time of molding.
Figure 9:
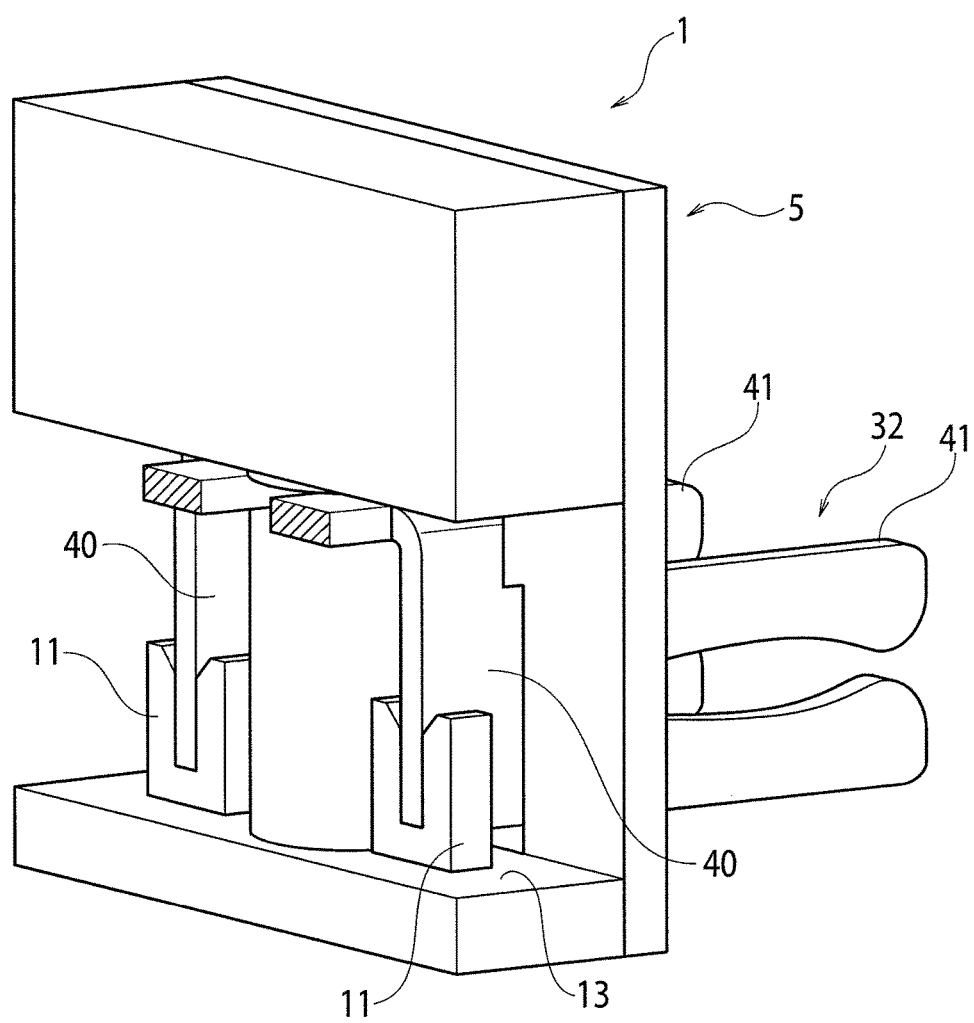
FIG. 9 is a perspective view illustrating the supporting state of the tuning-fork terminal at the time of molding from view of the back side of FIG. 8.
Figure 10:
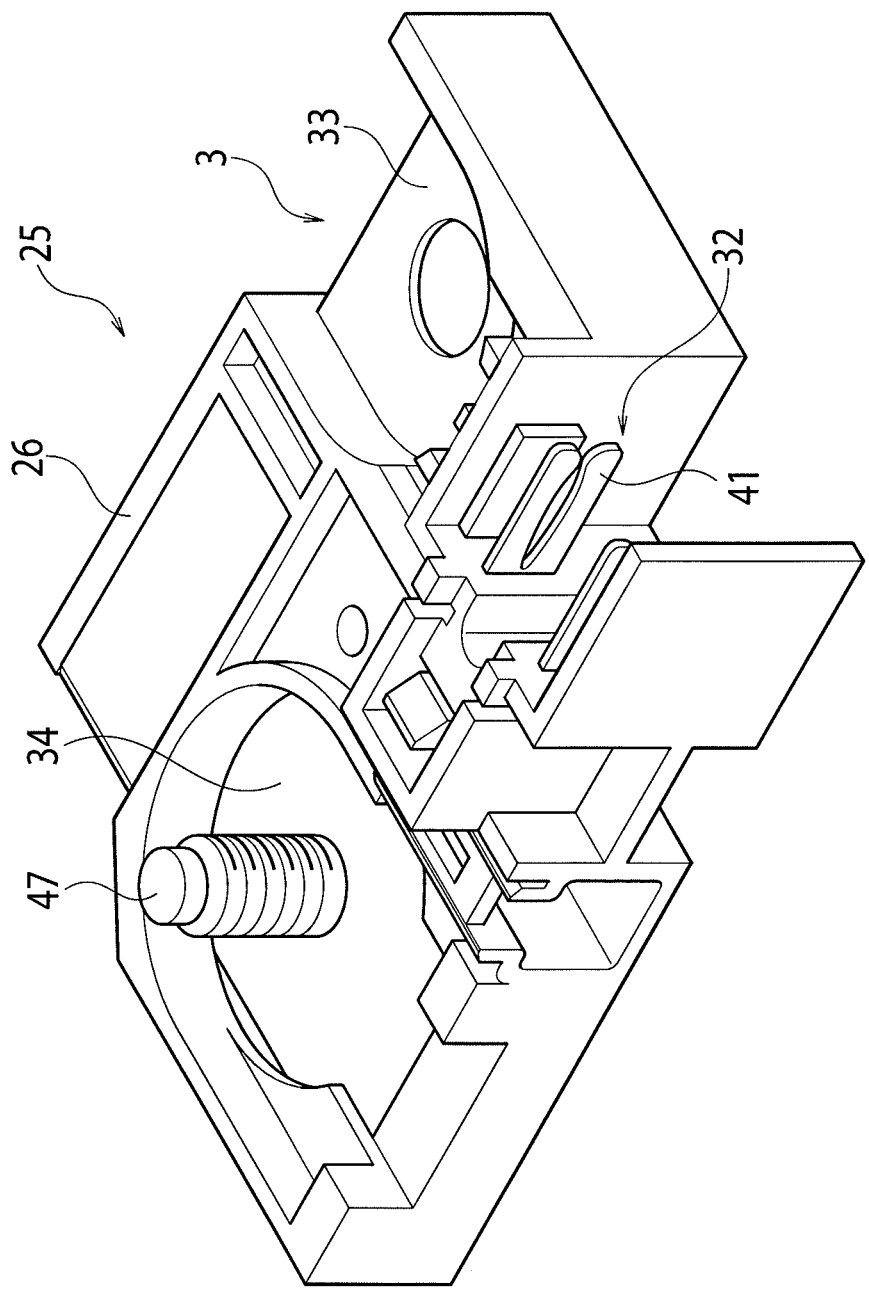
FIG. 10 is a perspective view illustrating a molded electrical component.
Figure 11B:
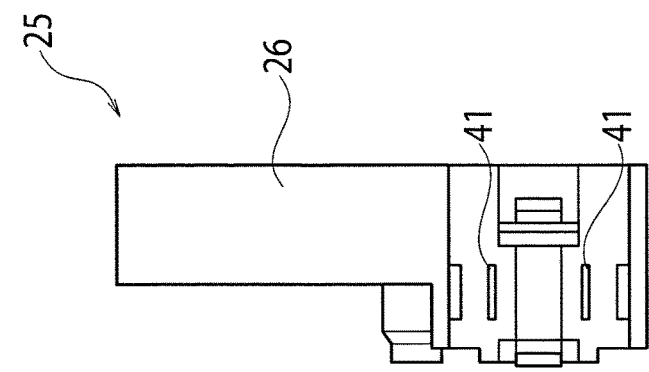
FIG. 11B is a right side view of the molded electrical component.
Figure 11A:
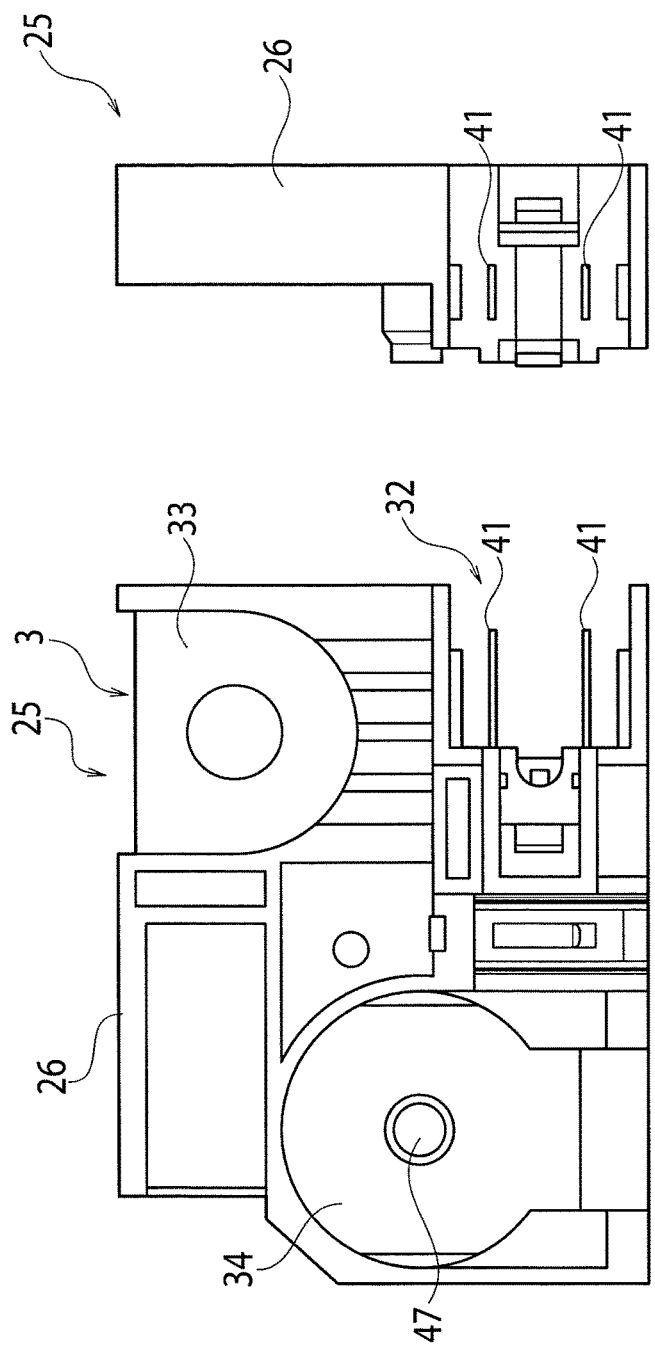
FIG. 11A is a plane view of the molded electrical component.
Figure 11C:
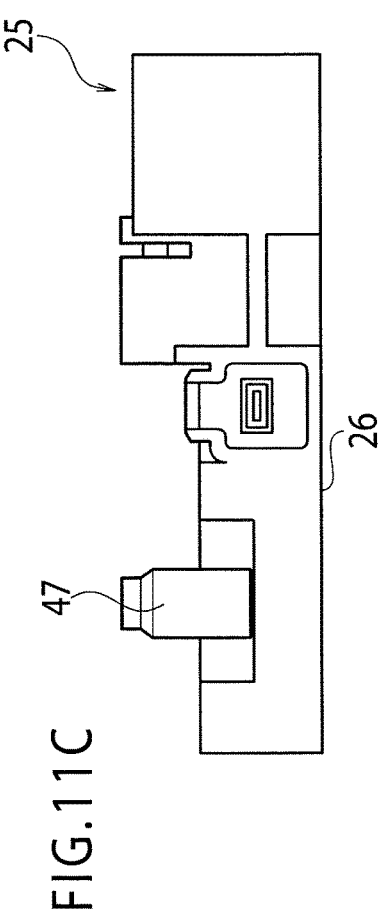
FIG. 11C is a front view of the molded electrical component.
Figure 12:
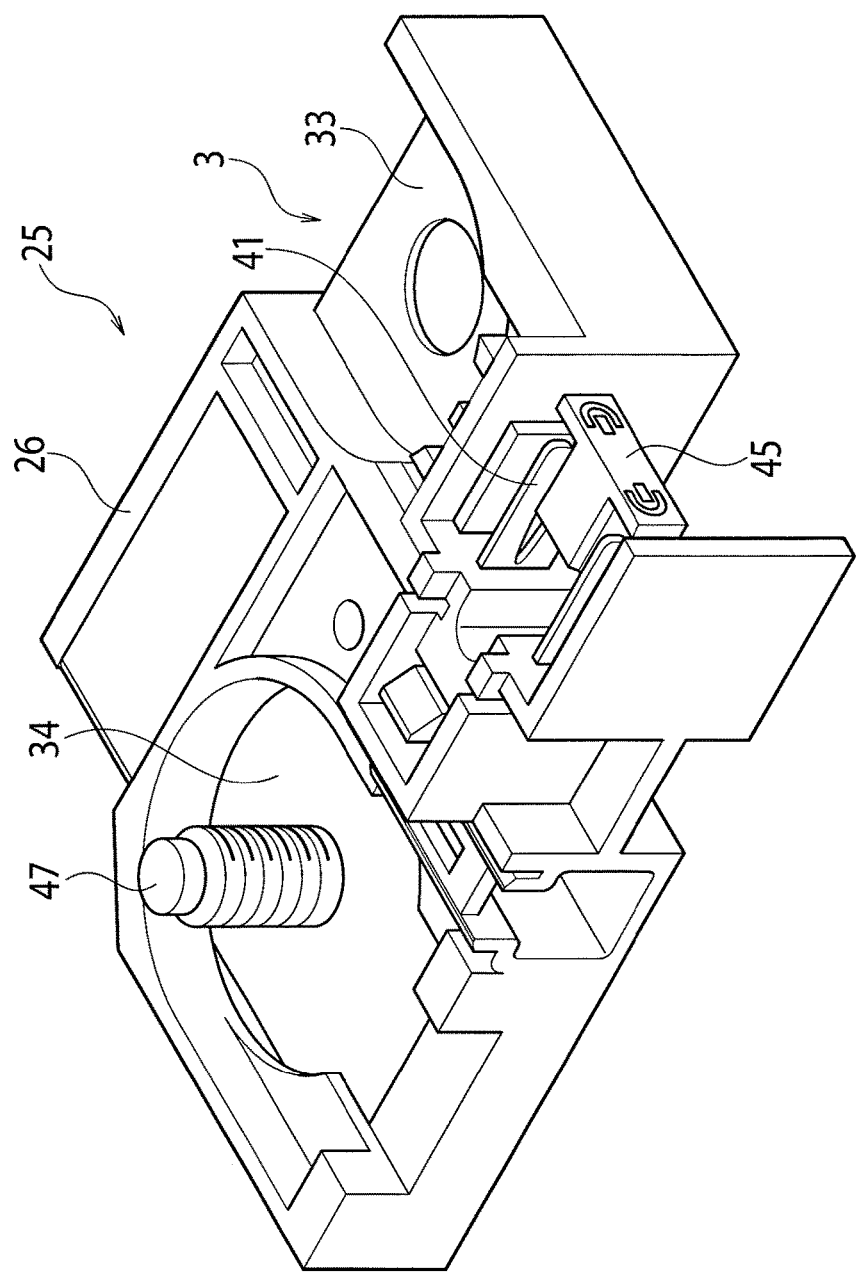
FIG. 12 is a perspective view of a state where a fuse is attached to the molded electrical component.
Figure 13:
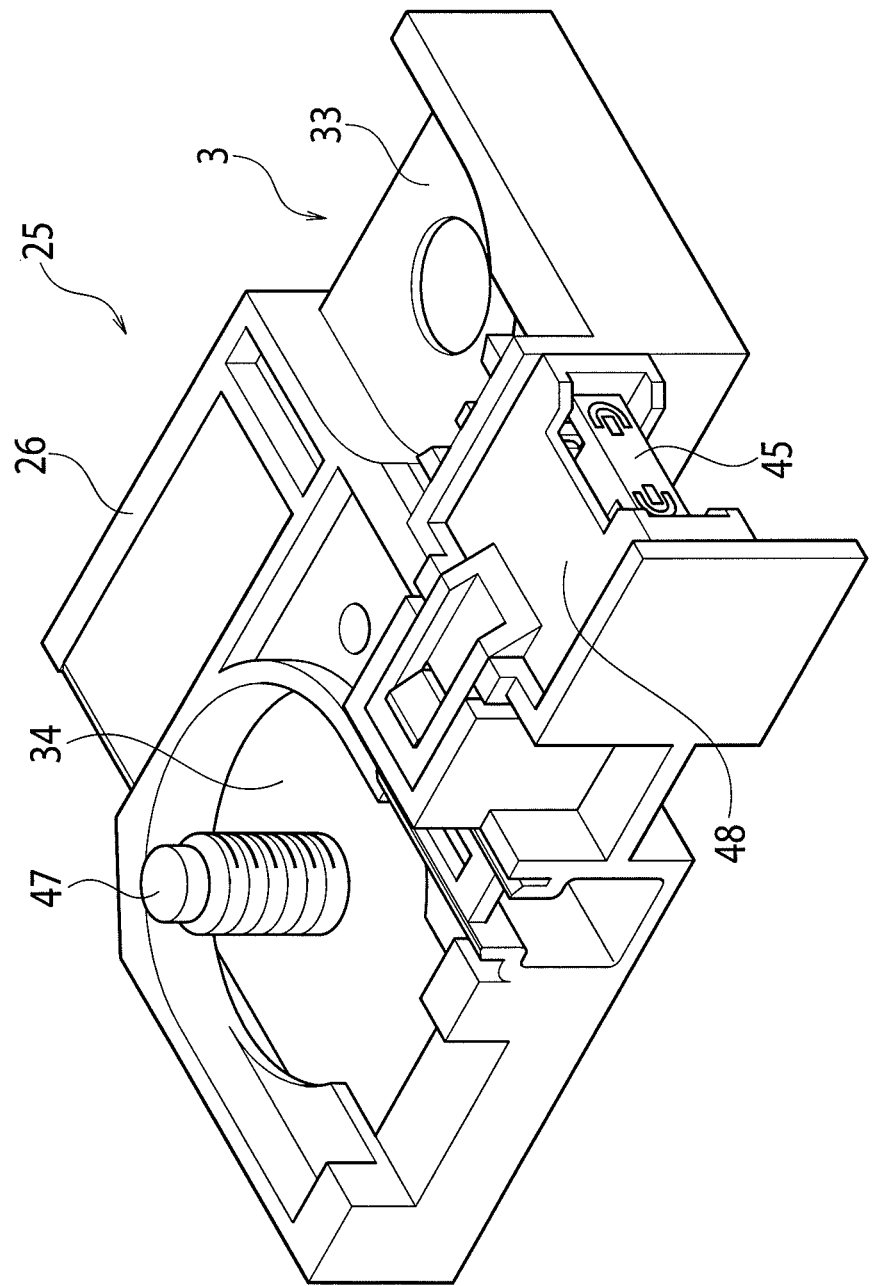
FIG. 13 is a perspective view of a state where a cover is attached to the fuse part of the electrical component.

In the following, an embodiment of the present invention will be described in detail with reference to the drawings. FIGS. 3 to 13 are an embodiment of the present invention. FIGS. 3 and 4 illustrate a bus bar. FIG. 5 is a perspective view of a substantial part of a mold structure. FIG. 6 is a sectional view of the substantial part of the mold structure. FIG. 7 is a perspective view of the bus bar. FIGS. 8 and 9 are perspective views of a supporting state of the tuning-fork terminal at the time of molding. FIGS. 10 and 11 illustrate a molded electrical component. FIGS. 12 and 13 illustrate perspective views of post-processing for the molded electrical component.

As illustrated in FIGS. 3 and 4A to 4C, a bus bar 3 applied to a mold structure 1 of the present embodiment is formed by arranging a tuning-fork terminal 32 to a main body circuit unit 31. At the main body circuit unit 31, a power source side terminal plate 33 which has a power source side stud bolt hole 33a formed and a connection side terminal plate 34 which has a connection bolt hole 34a formed are connected with a fusible body portion 35. The fusible body portion 35 melts when excessive current flows from the power source side and a load connected to the connection side terminal plate 34 is protected owing to the melting.

The tuning-fork terminal 32 is arranged in a state as being connected to the power source side terminal plate 33 side. As illustrated in FIGS. 4A to 4C and 7, the tuning-fork terminal 32 includes a bus bar end 37 which is connected to the power source side terminal plate 33 and a press fitting contact portion 38 arranged in an extended manner from the bus bar end 37. The bus bar end 37 is formed with a horizontally long connection portion 39 connected to the power source side terminal plate 33 and a right-left pair of terminal bases 40 integrally folded at a right angle from the both end portions of the connection portion 39 in the length direction. The horizontally long connection portion 39 is cut off before or after molding the bus bar 3.

The press fitting contact portion 38 includes a pair of nipping pieces 41 linearly arranged in an extended manner from the respective terminal bases 40. The pair of nipping pieces 41 extends in parallel as mutually opposing as well as the respective terminal bases 40. The respective nipping pieces 41 have a slit 42 extended in the length direction and the extended end portion of the slit 42 is opened to be an insertion opening 43. A fuse 45 (see FIG. 12) which is a counterpart terminal is inserted into the insertion opening 43 and the nipping pieces 41 pressure-contact to the inserted fuse 45 from upper and lower sides. An electrical connecting between the tuning-fork terminal 32 (bus bar 3) and the fuse 45 is performed owing to the pressing and contacting.

The mold structure 1 of the present embodiment integrally buries the abovementioned bus bar 3 with molding of a resin molded product of a fixed mold 4 (lower mold) and a movable mold 5 (upper mold). A mold main body portion (not illustrated) to set the main body circuit unit 31 of the bus bar 3 is formed at the fixed mold 4. At the movable mold 5, a mold main body portion (not illustrated) to form a cavity for molding of the resin molded product together with the mold main body portion of the fixed mold 4 is formed as opposing to the mold main body portion of the fixed mold 4. The main body circuit unit 31 of the bus bar 3 is set in the mold main body portions of the molds 4, 5 and resin is injected into the cavity after mold joining (mold clamping). Thus, the main body circuit unit 31 is integrally buried with the resin.

FIGS. 5, 6, 8, and 9 illustrate a set structure of the fixed mold 4 and the movable mold 5 against the tuning-fork terminal 32.

As illustrated in FIGS. 5 and 9, a pair of bus bar set portions 11 to set the terminal bases 40 of the tuning-fork terminal 32 is formed at a set part of the tuning-fork terminal 32 at the fixed mold 4. Each bus bar set portion 11 has a set groove 11a which is opened upward to have the terminal bases 40 inserted. Positioning installation of the tuning-fork terminal 32 against the fixed mold 4 is performed by inserting the terminal base 40 into the set groove 11a. The bus bar set portion 11 is formed at a position in the vicinity of an outer circumferential wall 12 (burr cut portion) of the fixed mold 4. According to the present embodiment, setting of the terminal base 40 to the bus bar set portion 11 is performed as having the pair of nipping pieces 41 of the tuning-fork terminal 32 protruded to the outside of the fixed mold 4 and the movable mold 5, as illustrated in FIGS. 5, 8, and 9.

The nipping pieces 41 of the tuning-fork terminal 32 are located at the movable mold 5 side in FIG. 5. However, FIG. 5 is for illustrative purposes to show relation of a later mentioned terminal base abut portion 17 and nipping pieces 41 and nipping pieces 41 of the tuning-fork terminal 32 are set to the bus bar set portions 11 of the fixed mold 4.

The bus bar set portions 11 are formed in the fixed mold 4 in a standing manner. The set groove 11a of the bus bar set portion 11 of the fixed mold 4 supports the terminal base 40 (lower face of the terminal base 40) with contacting to the terminal base 40 of the tuning-fork terminal 32.

An outer circumferential face 15 (burr cut portion) which is to be the same face with the outer circumferential wall 12 of the fixed mold 4 owing to mold joining is formed at the movable mold 5 (see FIG. 8). According to the present embodiment, a window portion 19 to which the outer circumferential wall 12 of the fixed mold 4 is fit with mold joining is formed at the movable mold 5. The window portion 19 is formed in a shape being suitable for the outer circumferential wall 12 of the fixed mold 4. As the outer circumferential wall 12 of the fixed mold 4 is fitted to the window portion 19, the outer circumferential wall 15 of the movable mold 5 and the outer circumferential wall 12 of the fixed mold 4 form the same face.

The terminal base abut portion 17 corresponding (opposing) to the terminal base receiving portion 13 of the fixed mold 4 is formed at the outer circumferential wall 15 of the movable mold 5. The terminal base abut portion 17 abuts to the terminal base 40 (upper face of the terminal base 40) of the tuning-fork terminal 32 supported by the terminal base receiving portion 13 (set groove 11a of the bus bar set portion 11) owing to mold joining. The terminal base 40 is nipped together with the set groove 11a owing to the abutment.

As illustrated in FIG. 6, a receiving abut step portion 21 is formed at the fixed mold 4 and an abut step portion 23 corresponding to the receiving abut step portion 23 is formed at the movable mold 5. The receiving abut step portion 21 is formed by cutting out a vicinity of the bottom part of the fixed mold 4 in a plane manner and the forming position can be set at an arbitrarily position of the fixed mold 4. The abut step portion 23 is formed at the movable mold 5 corresponding to the receiving abut step portion 21. As the movable mold 5 is moved to the fixed mold 4 side and mold joining is performed, the abut step portion 23 of the movable mold 5 abuts to the receiving abut step portion 21 of the fixed mold 4. A cavity is formed between the mold main body portion of the movable mold 5 and the mold main body portion of the fixed mold 4 with the abutment. Simultaneously with the abutment, nipping of the terminal base 40 of the tuning-fork terminal 32 with the abovementioned set groove 11a and the terminal base abut portion 17 is performed.

Next, molding of the mold structure according to the present embodiment will be described.

The main body circuit unit 31 of the bus bar 3 is set to the mold main body portion of the fixed mold 4 in a mold opening state. At that time, for the tuning-fork terminal 32 of the bus bar 3, the terminal base 40 is inserted to the bus bar set portion 11 (set groove 11a) of the fixed mold 4 to be set. With the bus bar set portion 11 being set, the terminal base 40 of the tuning-fork terminal 32 becomes to a state to be supported by the terminal base receiving portion 13 (set groove 11a of the bus bar set portion 11) of the fixed mold 4. For such setting of the fixed mold 4 of the bus bar 3, the pair of nipping pieces 41 of the tuning-fork terminal 32 is arranged to be protruded outward of the outer circumferential wall 12 of the fixed mold 4.

After setting the abovementioned bus bar 3, the movable mold 5 is approximated to the fixed mold 4 and mold joining is performed. At the time of mold joining, the terminal base 40 of the tuning-fork terminal 32 is nipped with the terminal base receiving portion 13 (bus bar set portion 11 of the set groove 11a) of the fixed mold 4 and the terminal base abut portion 17 of the movable mold 5 while the abut step portion 23 of the movable mold 5 abuts to the receiving abut step portion 21 of the fixed mold 4. Thus, the nipping pieces 41 of the tuning-fork terminal 32 are maintained in a state as being protruded to the outside of the mold main body portions of the fixed mold 4 and the movable mold 5. That is, the nipping pieces 41 of the tuning-fork terminal 32 are at a free state at the outside of the mold main body portions of the fixed mold 4 and the movable mold 5.

With the terminal base 40 in a nipped state, melting resin is injected into the cavity formed with the mold main body portions of the fixed mold 4 and the movable mold 5 and cooling and hardening is performed. Thus, as illustrated in FIGS. 10 and 11, the main body circuit unit 31 of the bus bar 3 is buried in the resin molded product and an electrical component 25 which has the tuning-fork terminal 32 exposed at the outside of the resin molded product 26 such as a fusible link unit is formed. In FIGS. 10 and 11A to 11C, a stud bolt 47 is protruded upward from the resin molded product 26. Here, the stud bolt 47 is previously attached to the bus bar 3 to penetrate the connection bolt hole 34a.

FIG. 12 illustrates a state where the fuse 45 is attached to the electrical component 25 as a counterpart terminal. The fuse 45 is attached to the electrical component 25 in an electrical conduction state with the bus bar 3 by being inserted into the pair of nipping pieces 41 of the tuning-fork terminal 32 exposed from the resin molded product 26. FIG. 13 illustrates a protected state of the fuse 45 as a cover 48 is fixed over the mounting part of the fuse 45.

In such an embodiment, since injection of resin is performed in a state where a pair of nipping pieces 41 of the tuning-fork terminal 32 is protruded to the outside of the mold main body portion of the fixed mold 4 and movable mold 5, the nipping pieces of the tuning-fork terminal 32 are in a free state against the fixed mold 4 and the movable mold 5. Therefore, not only does the nipping pieces do not contact to the fixed mold 4 and the movable mold 5 but pressing force of the mold does not occur. Accordingly, the tuning-fork terminal 32 (nipping pieces 41) does not deform and occurrence of defective goods owing to deformation can be prevented.

Since positioning of the tuning-fork terminal 32 is performed as the terminal base 40 thereof is set to the bus bar set portion 11, positioning of the tuning-fork terminal 32 against the fixed mold 4 can be performed smoothly and accurately. In this case, the terminal base 40 is fixed to the fixed mold 4 and the nipping pieces 41 at the top end side of the terminal base 40 is in a free state. Therefore, the nipping pieces 41 electrically connected to the fuse 45 do not deform.

Since the resin molded product 26 is molded with the nipping pieces 41 of the tuning-fork terminal 32 protruded to the outside from the mold main body portion of the fixed mold 4 and the movable mold 5, the whole of the tuning-fork terminal 32 is not exposed from the resin molded product 26 and a part is buried in the resin molded product 26. Thus, supporting force of the resin molded product 26 against the tuning-fork terminal 32 is enlarged and strength can be applied to the tuning-fork terminal 32.

In the abovementioned embodiment, the bus bar 3 having the power source side terminal plate 33 and the connection side terminal plate 34 is adopted. However, a bus bar 3 having another structure may be adopted.

The abovementioned electrical component 25 is a fuse unit including a bus bar having a battery terminal or a fusible body attached to a battery terminal and a pressure-contact type fuse terminal connected to the bus bar. Here, the electrical component 25 is an example of a fuse unit (fusible link unit; fuse block) attached to a battery terminal as follows. The bus bar formed at the fusible body is molded with pressing, a pair of tuning-fork terminal connected to a fuse has one end connected to the bus bar, the other end has a terminal for external connection, the pair of tuning-fork terminal is arranged to vertically nip the fuse terminal, and the bus bar and the pair of tuning-fork terminal are molded integrally.

According to the fuse unit, molding can be performed without using a slide mold and the fuse terminal is nipped and held with the tuning-fork terminal. Therefore, a fuse holder to hold the fuse 45 is unnecessarily to be separately prepared.

Embodiments of the present invention are described in the above. However, the present invention is not limited to the above embodiments and various modifications can be performed.

What is claimed is:

1. A molding method using a mold structure to bury a bus bar having a main body circuit unit with a tuning-fork-like tuning-fork terminal along with molding of a resin molded product with a fixed mold and a movable mold, the tuning-fork terminal comprising: a bus bar end including a terminal base; and a press fitting contact portion having a pair of nipping pieces and integrally extended from the bus bar end, the pair of nipping pieces each having an insertion opening formed at a top end side thereof for a counterpart terminal and a slit formed continuously from the insertion opening, the terminal base being a closed end of the slit, the nipping pieces mutually facing each other such that the slits of the nipping pieces mirror each other, the molding method comprising:
  setting the bus bar at a first mold main body portion of the fixed mold by supporting a terminal base of the tuning-fork terminal with the terminal base receiving portion of the fixed mold in a state where the pair of nipping pieces of the tuning-fork terminal is protruded outside a cavity formed by the first mold main body portion of the fixed mold and a second mold main body portion of the movable mold being joined together and where the terminal base is positioned inside the cavity;
  joining the movable mold together with the fixed mold by abutting an abut step portion of the movable mold to a receiving abut step portion of the fixed mold and nipping the terminal base of the tuning-fork terminal with the terminal base receiving portion and a terminal base abut portion of the movable mold, wherein the terminal base receiving portion comprises a bus bar set portion, and the terminal base is inserted into a set groove of the bus bar set portion; and
  injecting resin into the cavity in a nipped state in which the nipping pieces with the slits mirroring each other are protruded outside the cavity,
  wherein the terminal base is covered with the resin.

2. The molding method of claim 1, wherein the terminal base abut portion of the movable mold comprises a right-angle portion and the terminal base abut portion of the movable mold contacts the terminal base of the tuning-fork terminal on a top surface and a side surface of the terminal base.

3. The molding method of claim 1, wherein the terminal base in the nipped state is integrally folded from both end portions of a connection portion of the bus bar end connected to a power source side terminal plate, and wherein the injecting the resin into the cavity is performed with the terminal base folded.

4. The molding method of claim 1, wherein the terminal base in the nipped state is integrally folded at a right angle from both end portions of a connection portion of the bus bar end connected to a power source side terminal plate.

* * * * *